US008052768B2

(12) United States Patent
Lin et al.

(10) Patent No.: US 8,052,768 B2
(45) Date of Patent: Nov. 8, 2011

(54) AIR FILTRATION APPARATUS

(75) Inventors: Jhun Lin, Novi, MI (US); Mark Edward Hipp, South Lyon, MI (US); Jerome George Wiencek, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 383 days.

(21) Appl. No.: 12/469,708

(22) Filed: May 21, 2009

(65) Prior Publication Data

US 2010/0293905 A1 Nov. 25, 2010

(51) Int. Cl.
*B01D 50/00* (2006.01)

(52) U.S. Cl. .............. 55/320; 55/325; 55/385.2; 55/446

(58) Field of Classification Search .................... 55/320, 55/321, 325, 385.2, 445, 446
See application file for complete search history.

(56) References Cited

U.S. PATENT DOCUMENTS

| | | | | |
|---|---|---|---|---|
| 4,693,393 | A | 9/1987 | DeMinco et al. | |
| 5,024,687 | A | 6/1991 | Waller | |
| 5,058,693 | A | 10/1991 | Murdock et al. | |
| 5,149,347 | A | 9/1992 | Turner et al. | |
| 5,501,198 | A | 3/1996 | Koyama | |
| 5,638,786 | A | 6/1997 | Gimby | |
| 5,912,368 | A | 6/1999 | Satarino et al. | |
| 6,797,024 | B2 * | 9/2004 | Inoue | 55/319 |
| 7,013,878 | B1 | 3/2006 | Cotton et al. | |
| 7,201,155 | B2 | 4/2007 | Mills | |
| 7,210,466 | B1 | 5/2007 | Roche | |
| 7,250,387 | B2 | 7/2007 | Durante et al. | |
| 2007/0056589 | A1 | 3/2007 | Capon | |
| 2007/0107702 | A1 | 5/2007 | King | |
| 2008/0006248 | A1 | 1/2008 | Rockwell et al. | |

FOREIGN PATENT DOCUMENTS

| | | |
|---|---|---|
| EP | 0 947 366 | 10/1999 |
| WO | WO 2007/087102 | 8/2007 |

* cited by examiner

*Primary Examiner* — Robert A Hopkins

(57) ABSTRACT

An air filter assembly is provided for an evaporative emissions control canister used with an internal combustion engine fuel system. The air filter assembly includes: a housing having an air inlet formed in an upper portion of the housing and an air outlet; and a plurality of vertically extending baffles disposed within the housing between the upper portion of the housing and a bottom portion of the housing. The baffles form a plurality of vertically extending channels interconnected horizontally through horizontally interconnecting channels disposed adjacent the upper portion of the housing and an opposing bottom portion of the housing. A first one of the vertically extending channels receives air entering the housing from the air inlet. The air then passes laterally outwards in the housing from the first one of the vertically extending channels successively to other ones of the vertically extending channels in a serpentine flow successively upwards and downwardly and through the horizontally interconnecting channels and then finally exiting the housing through the air outlet. A filter is disposed in one of the plurality of vertically extending channels in a path of the serpentine flow of the air passing through such one of the vertically extending channels.

22 Claims, 6 Drawing Sheets

AIR FILTRATION APPARATUS

TECHNICAL FIELD

This disclosure relates generally to air filtration apparatus and more particularly to air filtration apparatus for use with fuel vapor recovery system. Still more particularly, the disclosure relates to an air filter for an automotive vehicle fuel vapor recovery system, which includes structures for gradually separating unwanted particles of dust, moisture, soot, and the like from the vapor recovery system purge air stream.

BACKGROUND

As is known in the art, conventional fuel vapor recovery systems used in automotive vehicles typically include a carbon canister used to recover excess fuel vapor generated in the fuel tank. Activated carbon in the carbon canister adsorbs the fuel vapor and temporarily retains the vapor until the canister is purged. During vehicle operation, at times determined by programmed vehicle calibration, the fuel vapor adsorbed by the activated carbon is desorbed by introducing outside air, or purge air, to the canister. The fuel vapor thus desorbed is fed to the engine for utilization in combustion.

More particularly, automotive internal combustion engines utilize a carbon canister connected to the fuel tank to collect fuel vapors from the fuel tank as the tank is being refilled, or when the vehicle is parked. The canister connected to the engine also allows the vapor stored within the canister to be pulled to the engine for burning during the "purge" cleansing process. Filtered fresh air is necessary for the purging process so that environmental contaminates do not eventually plug the carbon bed or damage some valves which may lead to the generation of On Board Diagnostic (OBD-II) detection faults. An air filtering apparatus with a built-in Canister Vent Valve (CVV) can become an important design element assuring the supply of this clean air.

Filtering of-purge air introduced to a vapor recovery system to purge the carbon canister is not new. For the mentioned purpose, prior art examples teach the use of one or more assemblies comprising either a filter medium, baffle means, or both. More particularly, U.S. Pat. No. 5,058,693 to Murdock et al, U.S. Pat. No. 5,024,687 to Waller, and U.S. Pat. No. 5,638,786 to Gimby each disclose a remote fuel vapor recovery system filter assembly comprising the combination of baffle and filter element means. Both '693 and '687 include simple baffle means comprising no more than two independent baffle entities. The present disclosure discloses a plurality of mating and nonmating planar baffles, the increased complexity of which is matched by increased functional efficiency. Patent '768 provides a self-cleaning air filter comprising a filter element of various embodiments. In each embodiment, this mentioned element, so that it may be cleaned by the disclosure's filter cleaning member, is apparently a thin, firm, screen-like entity, and the filter includes provisions for function upon "occlusion" of this element. The present disclosure is comprised of a robust and hearty (thick, wide and tall) filter element and a baffle area, and has been proven to be able to last the average lifetime usage of vehicles (approximately 150,000 miles) without any cleaning.

There are two primary and novel factors contributing to the long-lasting functionality of our disclosure. The first is found in the design of the baffle section. The plurality of baffles are designed such that the particles, having wide size and inertial distributions, are dislodged from the air stream as it travels from inlet towards the filter section. This occurs due to decreased baffle spacing between baffles and the corresponding increase in mobility demand placed on the air flow. The second primary and novel quality of our disclosure is found in the implementation of a filter element so that the smallest particles (those that survive the baffle section) are generally lodged in the upper half of the filter element and eventually, due to gravity, vibration, etc., will migrate to the lower portions of the element. This occurrence will ensure the thorough cleaning of the air and the long-lasting function of the air filter assembly.

U.S. Pat. No. 4,693,393 to DeMinco et al and U.S. Pat. No. 5,501,198 to Korama disclose examples of filtering systems integrally combined within a carbon canister by comprising only baffle means and only filter element means, respectively. U.S. Pat. No. 5,149,347 to Turner et al also discloses a separator device comprising only a baffle section, which is remotely connected to the carbon canister. It is apparent that any structure comprising only baffle means or only filter means will not be as effective and robust as the present disclosure comprising both baffle and particulate filter means.

U.S. Pat. No. 5,912,368 to Satarino et al., describes a filter that both graduated baffle separation means and filter element means are included in a filter assembly. This assures a maximum degree of separation of particles, foreign matter, such as soot and road dust, moisture, and the like from the fresh air therein otherwise present.

SUMMARY

In accordance with the present disclosure, an air filter assembly is provided for an evaporative emissions control canister used with an internal combustion engine fuel system. The air filter assembly includes: a housing having an air inlet formed in an upper portion of the housing and an air outlet; and a plurality of vertically extending baffles disposed within the housing between the upper portion of the housing and a bottom portion of the housing. The baffles form a plurality of vertically extending channels interconnected horizontally through horizontally interconnecting channels disposed adjacent the upper portion of the housing and an opposing bottom portion of the housing. A first one of the vertically extending channels receives air entering the housing from the air inlet. The air then passes laterally outwards in the housing from the first one of the vertically extending channels successively to other ones of the vertically extending channels in a serpentine flow successively upwards and downwardly and through the horizontally interconnecting channels and then finally exiting the housing through the air outlet. A filter is disposed in one of the plurality of vertically extending channels in a path of the serpentine flow of the air passing through such one of the vertically extending channels.

In one embodiment, the housing has an outer side peripheral portion and the air outlet is disposed in a portion of the bottom portion of the housing adjacent the outer side peripheral portion of the housing.

In one embodiment, the housing has an outer side peripheral portion and the air outlet is disposed adjacent the outer side peripheral portion of the housing.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
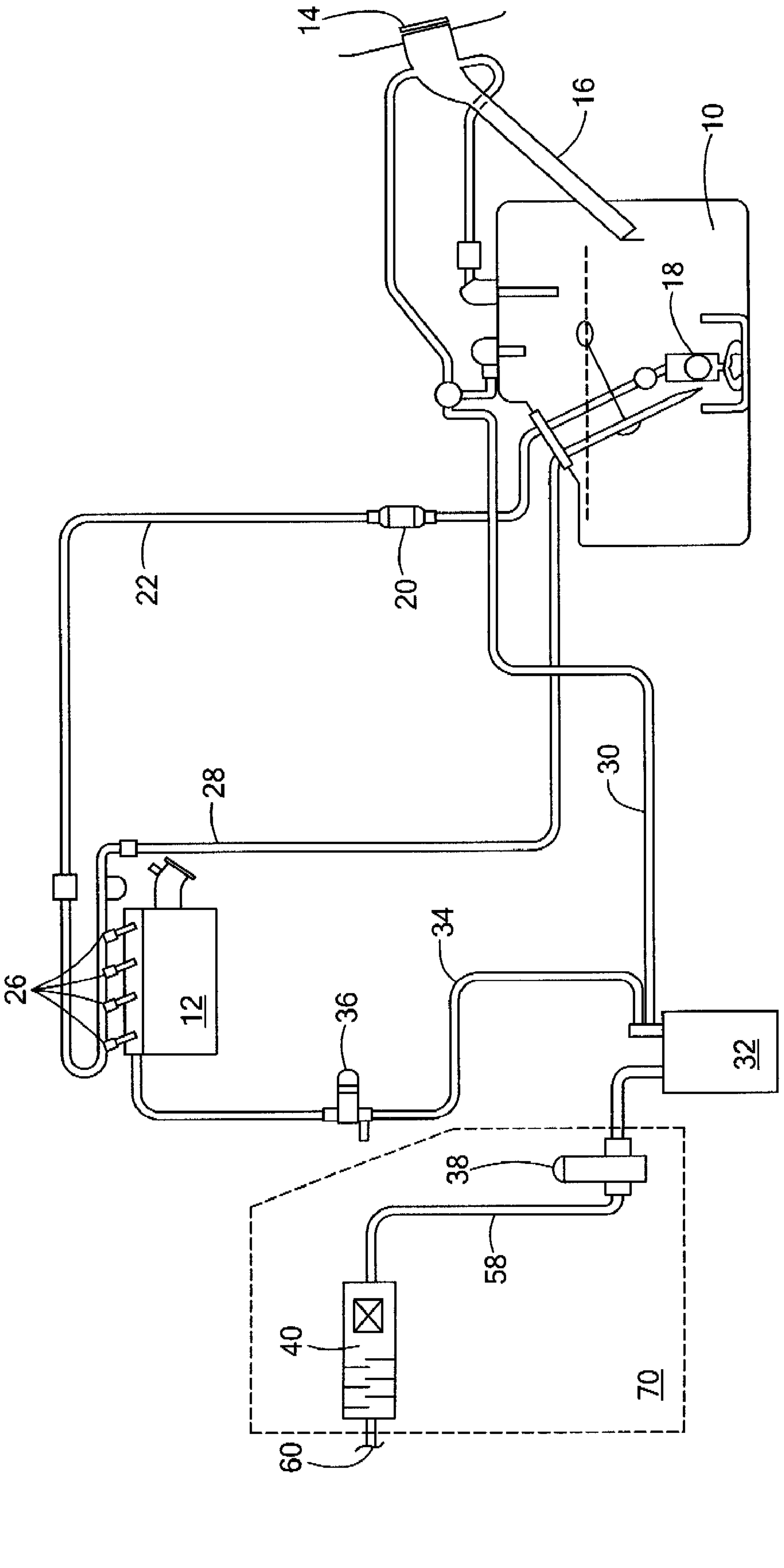
FIG. 1 is a schematic diagram of an automotive evaporation emission system having a fuel vapor recovery system utilizing an air filter assembly according to the disclosure.
Figure 2:
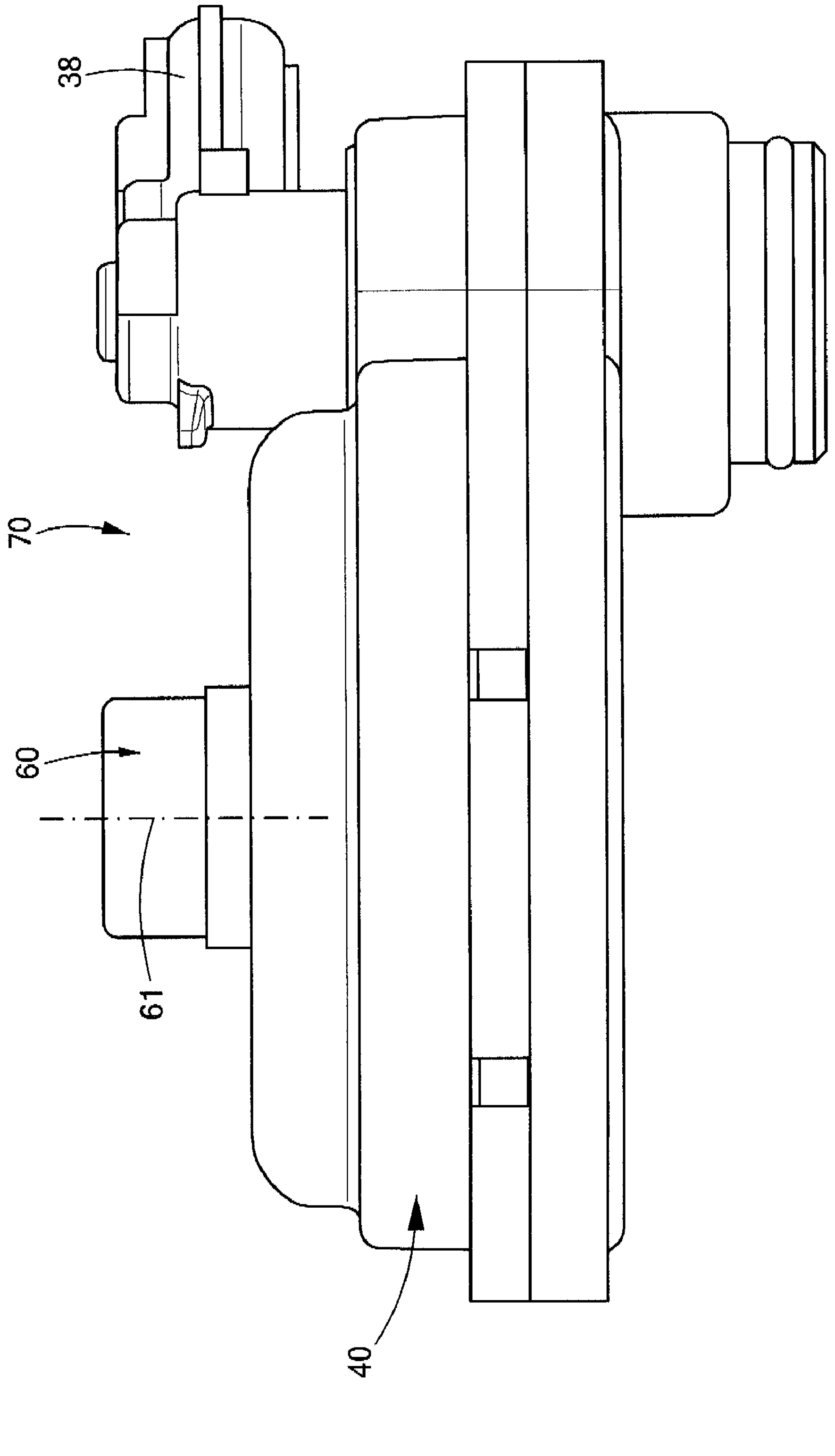
FIG. 2 is a side elevation view of the air filter assembly used in FIG. 1 according to the disclosure.
Figure 3:
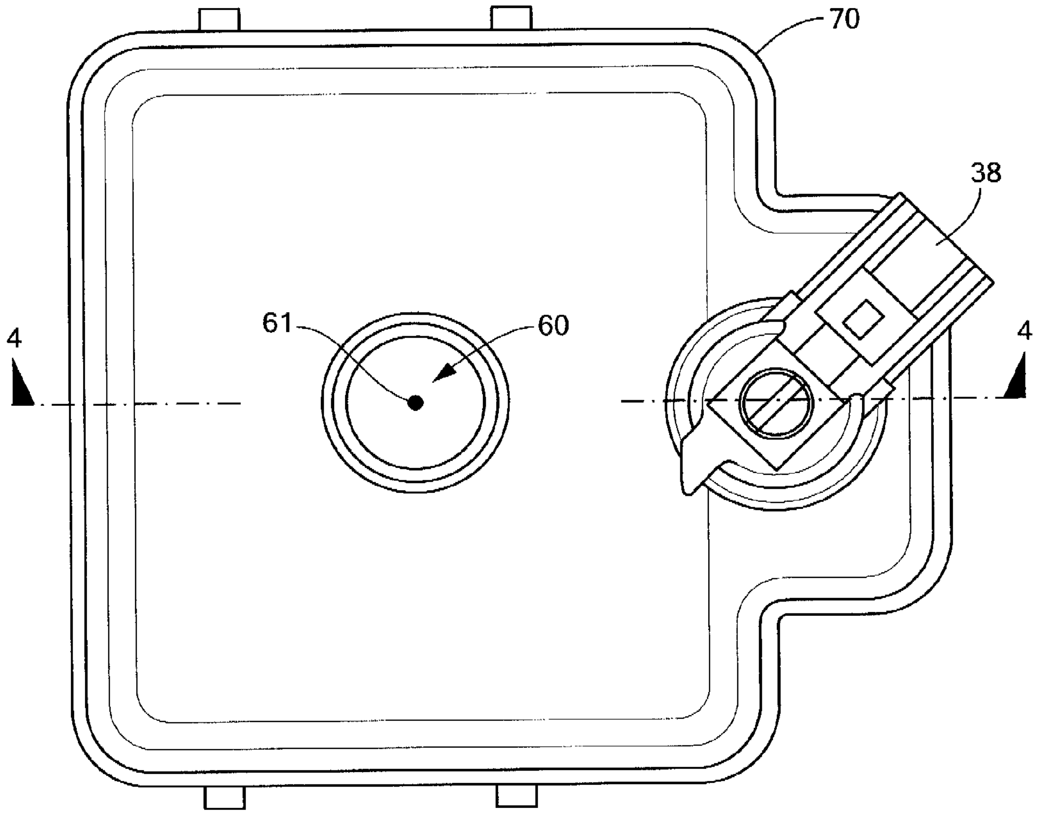
FIG. 3 is a top view of the air filter assembly used in FIG. 1 according to the disclosure.

FIG. 1 shows an automotive evaporation emission system having a fuel vapor storage system (FVSS) integrally disposed therein. Although some of the evaporation emission system's specific components, geometry, and component names may differ from vehicle to vehicle, the primary structure and structural components will remain constant.

Primary components of the automotive evaporation emission system are fuel tank 10 and internal combustion engine 12. Liquid fuel enters the vehicle by first being introduced to the fuel inlet opening 14 then traveling through fuel filler tube 16 into fuel tank 10. Fuel is sent by fuel pump 18 through fuel filter 20 and to engine 12 by way of fuel line 22, fuel rail 24, and fuel injectors 26. Optionally, some systems will recycle fuel unused by engine 12 by sending it back to fuel tank 10 via the fuel return line 28.

There are generally two primary circumstances wherein fuel vapor filled air is forced out of fuel tank 10. The first circumstance is during the above outlined filling of tank 10 and the other occurs when the fuel vapor in the tank expands (usually due to increased temperature of the fuel and/or fuel vapor) and forces some of the fuel vapor out of the tank. In either case, the fuel vapor filled air is sent through fuel recovery line 30 to carbon canister 32 where it is cleaned of its vapor before being sent to the atmosphere. Carbon canister 32 is filled with activated carbon which adsorbs the fuel vapor from the air flow.

Periodically, carbon canister 32, after absorbing and cleaning the fuel vapor filled air, must be desorbed, or purged, of the fuel vapor therein. This refreshing is done so that the canister can accommodate and absorb additional fuel vapor from fuel tank 10.

Atmospheric air, to be used as purge air, is forced into and out of canister 32 and then sent through vapor purge line 34, and canister purge valve 36, directly to engine 12 for utilization.

As mentioned above, the outdoor air used as purge air must be cleaned of substantially all matter before it is introduced to canister vent valve 38 (CVV) and carbon canister 32. This is the purpose of the air filter assembly 40 contained along with the CVV 38 in a common housing 70.

Figure 4:
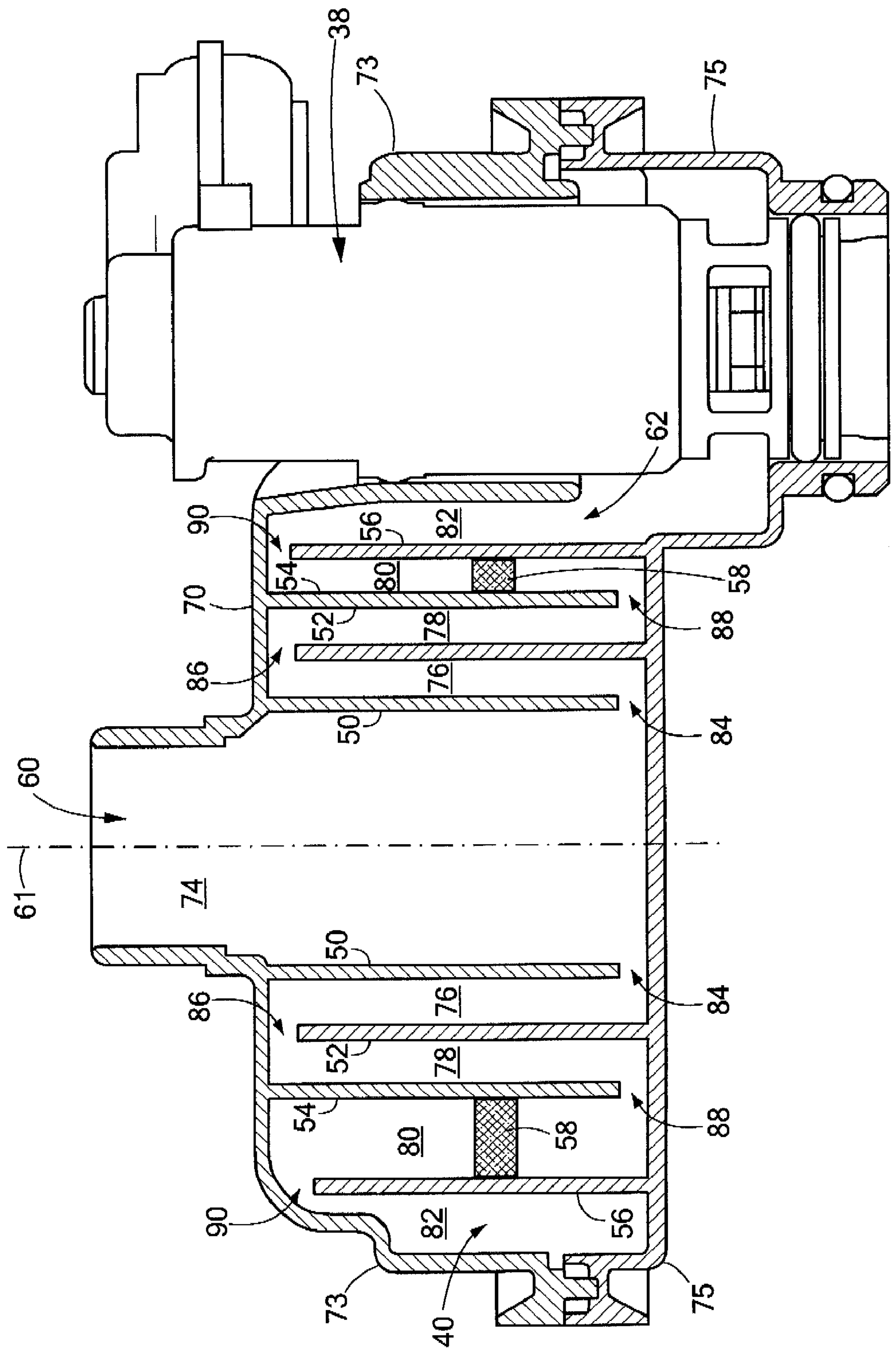
FIG. 4 is a cross sectional view of the air filter assembly used in FIG. 1 according to the disclosure, such cross section being taken along line 4-4 in FIG. 3 according to the disclosure.

The preferred design of the air filter assembly 40 is best viewed in FIGS. 2-6. Briefly, the air filter assembly 40 has integrated mounting features that enable the assembly to be installed directly to the carbon canister 32. Further, the air filter assembly 40 includes therein the canister vent valve (CVV) 38 in addition to a plurality of concentric circularly baffles 50-54 (FIG. 4) (i.e., the baffles 50-54 are circular tube-like structures having circular walls), a rectangular baffle 56 (FIG. 4) (i.e., the baffle 56 is a rectangular tube-like structure having rectangular walls), a filter 58 (FIG. 4). An inlet air port 60 is provided for incoming fresh air and an outlet port 62 (FIG. 4) is provided and coupled to the CVV 38, as indicated in FIG. 1. It is noted that the baffles 50-54 are concentric about a longitudinal axis 61 disposed through the center of the air inlet port 60. It is noted that the CVV 38 may be a built-in or plug in part of the housing 70. The valve 38 may be an electrical, mechanical, pneumatic or other device to allow the opening/closing of the flow path by microcontroller, not shown.

Figure 5:
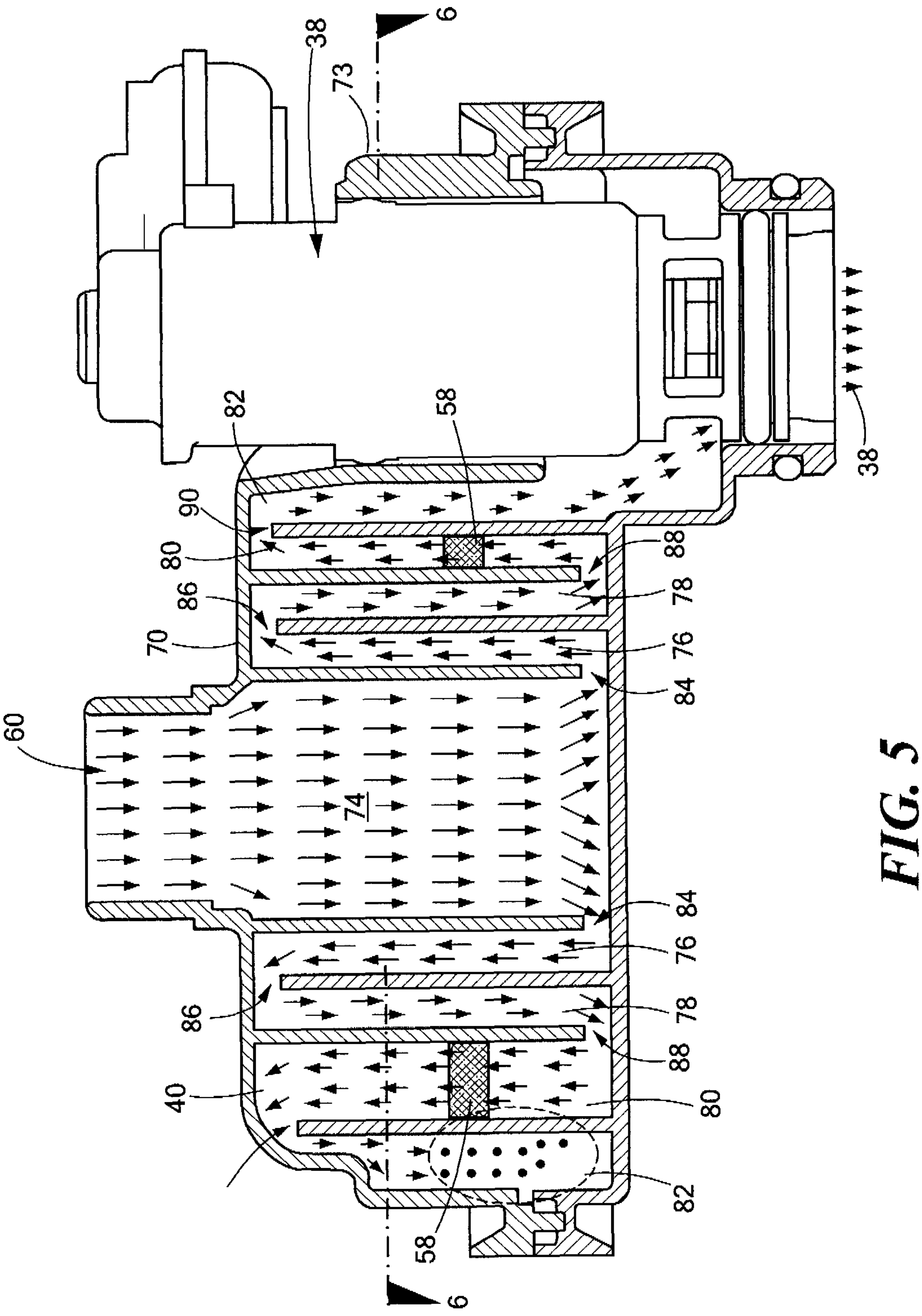
FIG. 5 is a cross sectional view of the air filter assembly used in FIG. 1 according to the disclosure, such cross section being taken along line 4-4 in FIG. 3 as in FIG. 4, here showing with arrows the flow of air though the air filter assembly according to the disclosure.

More particularly, and referring now to FIGS. 4 and 5, the air filter assembly 40 includes the housing 70 having the air inlet 60 formed in an upper portion 73 of the housing 70 and the air outlet 62. The baffle 50 extends vertically downward from the air inlet 60 in the upper portion 73 of the housing 70 towards, but short of, a bottom portion 75 of the housing 70. The baffles 50-56 form a plurality of vertically extending channels 74-82 interconnected horizontally through horizontally interconnecting channels 84-86 disposed adjacent the upper portion 72 of the housing 70 and an opposing bottom portion of the housing 70. It is noted that the channels 74-80 are concentric about the longitudinal axis 61 disposed through the center of the air inlet port 60.

Thus, the walls of the baffles 52-56 form a plurality of vertically extending channels 74-82 interconnected through horizontally interconnecting channels 84-90 formed between distal edges of the baffles 50-56 and the upper or lower portions 71, 73, as the case may be, of the housing 70. A first one of the vertically extending channels, here channel 74 receives air entering the housing from the air inlet 60, as shown in FIG. 5. The air passes downwardly in the first one of the channels 74, then passing laterally outwards through the horizontally interconnecting channel 84, then passing upwardly through a second one of the vertically extending channels 76, and then finally exiting the housing through the air outlet. A filter structure is disposed in the second one of the vertically extending channels.

A first one of the vertically extending channels 74-82, here channel 74, receives air entering the housing 70 from the air inlet 60. The air then passes laterally outwards in the housing 70 from the first one of the vertically extending channels 74 successively to other ones of the vertically extending channels 76, then 78, then 80, then 82 in a serpentine flow successively upwards and downwardly and through the horizontally interconnecting channels 84-86 and then finally exiting the housing 70 through the air outlet 62. The flow of the air is shown by arrows in FIG. 6, it being noted that as the air flows successively through channels 76, then 78, then 80, then 82, the velocity of the air decreases as indicated by the successively smaller lengths of the arrows. More particularly, it is noted that as the air passes successively through these vertically extending channels 76-82, because the cross sectional area of the channels 76-82 is successively increasing, the volume of the air in each of the channels 76-82 successively increases thereby successively reducing the velocity of the air. Thus, as the air passes successively through the channels-82, relatively larger particles in the air will fall on the bottom portion of the housing under the channels closer to the axis 61 and smaller particles will fall to the bottom of the housing under the channels further away from the axis 61.

The filter 58 is disposed in one of the plurality of vertically extending channels 74-82, here channel 80, in a path of the serpentine flow of the air passing through such one of the vertically extending channels 74-82.

Figure 6:
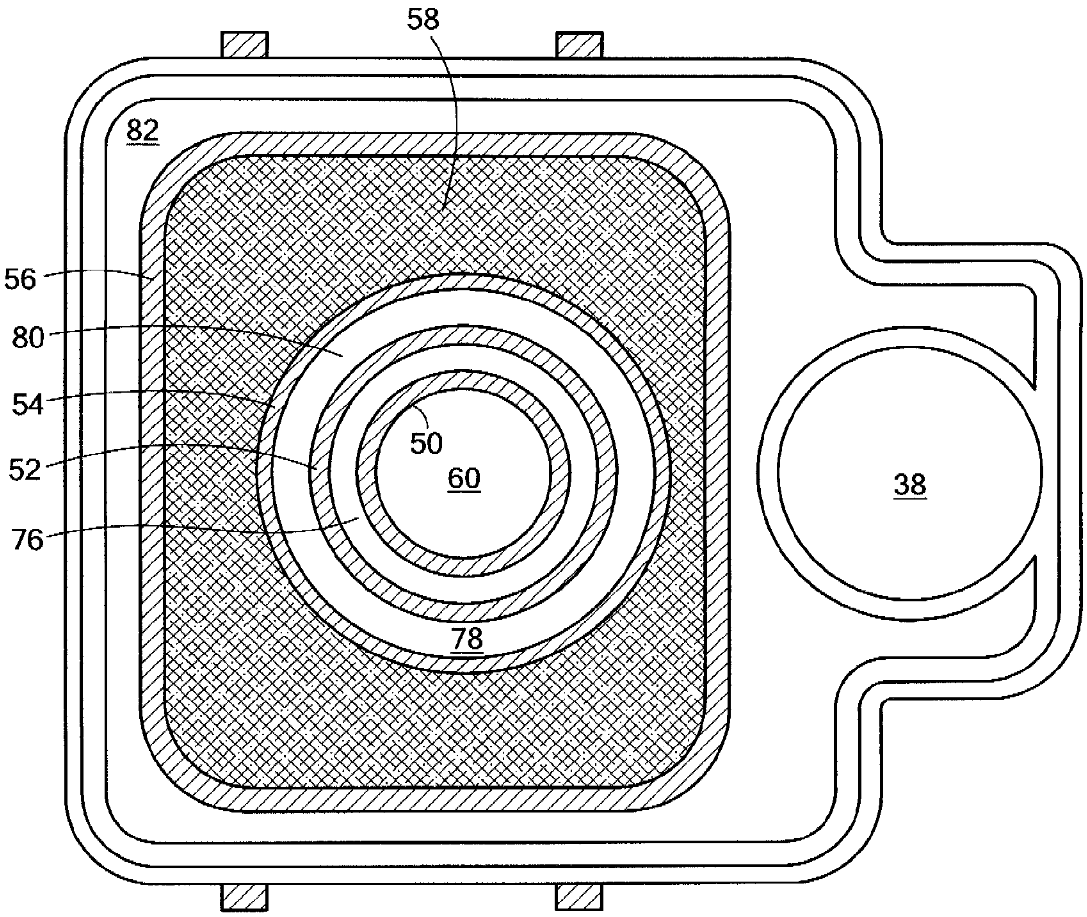
FIG. 6 is a cross sectional view the air filter assembly used in FIG. 1 according to the disclosure, such cross section being taken along line 6-6 in FIG. 5 according to the disclosure.

Three primary/innovative features of this disclosure provide for effective filtration in various orientations with the least flow restriction before and after ingesting a large quantity of dust. First, concentric baffles 50-54 with proper spacing between the baffles 50-56 are configured in the way to diverge radically the air flow, impinge it against the surface of the device perpendicularly; abruptly change the direction of the air, as shown in FIG. 6. This reduces the velocity rapidly in order to separate out the dust particles, which have relatively wide size range and inertial distributions, from the air stream as it travels from the air inlet through these baffles. Second, the implementation of the filter media element 50 catches some smaller particles (those that survive through the concentric baffles section) with the low momentum. Third, the rectangular baffle 56 makes the air flow with suddenly changed directions to flow over and around the baffle 56 to reach the outlet 62 of the assembly 40. This can further reduce the velocity so as to lodge those finest survived dusts within the compartment located between rectangular baffle and the outside wall of the device. As a result, the air filter will ensure the thorough cleaning of the air to the fuel vapor recovery system.

In addition to the filtration function, the filtration device also reduces the part complexity. Concentric circular and rectangular baffles 50-56 are molded directly in the filter body (i.e., housing 70). The mold-in mounting features are for installing the filter device 50 into the canister; and the built-in CVV 38 is for the vehicle On Board Diagnostic (OBD-II) leak check function. Therefore, it reduces the complexity of parts. The filter 50 may be supported within the housing 70 by any convenient means such as by thin posts (not shown) projecting into the upper and lower surfaces of the filter 58 from the top and bottom housing portions of the channel 80.

A number of embodiments of the disclosure have been described. Nevertheless, it will be understood that various modifications may be made without departing from the spirit and scope of the disclosure. For example, the baffles 50-54 may be rectangular. Still further, more or less baffles may be used. Accordingly, other embodiments are within the scope of the following claims.

What is claimed is:

1. An air filter assembly for removing dust in air entering the filter with an internal combustion engine fuel system, comprising:

a housing having: an air inlet formed in an upper portion of the housing; and an air outlet;

a plurality of vertically extending baffles disposed within the housing between the upper portion of the housing and a bottom portion of the housing, such baffles forming a plurality of vertically extending channels interconnected horizontally through horizontally interconnecting channels disposed adjacent the upper portion of the housing and an opposing bottom portion of the housing, a first one of the vertically extending channels receiving the air entering the housing from the air inlet, such air then passing laterally outwards in the housing from the first one of the vertically extending channels successively to other ones of the vertically extending channels in a serpentine flow successively upwards and downwardly and through the horizontally interconnecting channels and then finally exiting the housing through the air outlet; and wherein the bottom of the housing extends across a bottom of each one of the plurality of channels for retaining dust within the housing; and a filter disposed in one of the plurality of vertically extending channels in a path of the serpentine flow of the air passing through such one of the vertically extending channels.

2. The air filter assembly recited in claim 1 wherein the plurality of baffles is concentric about a center axis of the air inlet.

3. The filter assembly recited in claim 2 wherein a portion of the baffles has circular walls.

4. The filter assembly recited in claim 1 wherein the plurality of baffles is hollow tube-like structures.

5. The filter assembly recited in claim 1 wherein the housing has an outer side peripheral portion and the air outlet is disposed in a portion of the bottom portion of the housing adjacent the outer side peripheral portion of the housing.

6. The filter assembly recited in claim 1 wherein the housing has an outer side peripheral portion and the air outlet is disposed adjacent the outer side peripheral portion of the housing.

7. The filter assembly recited in claim 1 wherein different ones of the channels have different cross-sectional areas.

8. The filter assembly recited in claim 1 wherein cross sectional areas of the plurality of channels successively increase from a central region of the assembly to an outer region of the assembly.

9. The assembly recited in claim 1 wherein the horizontally extending channels are perpendicular to the vertically extending channels.

10. An air filter assembly, comprising:

a housing;

a plurality of vertically extending baffles disposed within the housing between an upper portion of the housing and a bottom portion of the housing, such baffles forming a plurality of vertically extending channels interconnected horizontally through horizontally interconnecting channels, a first one of the vertically extending channels receiving air entering the housing from an air inlet, such air then passing laterally outwards in the housing from the first one of the vertically extending channels successively to other ones of the vertically extending channels in a serpentine flow successively upwards and downwardly and through the horizontally interconnecting channels and then finally exiting the housing through the air outlet;

wherein the bottom of the housing extends across a bottom of each one of the plurality of channels for retaining dust within the housing; and a filter disposed in one of the plurality of vertically extending channels in a path of the serpentine flow of the air passing through such one of the vertically extending channels.

11. The air filter assembly recited in claim 10 wherein the plurality of baffles is concentric about a center axis of the air inlet.

12. The filter assembly recited in claim 11 wherein a portion of the baffles has circular walls.

13. The filter assembly recited in claim 10 wherein the plurality of baffles is hollow tube-like structures.

14. The filter assembly recited in claim 10 wherein different ones of the channels have different cross-sectional areas.

15. The filter assembly recited in claim 10 wherein cross-sectional areas of the plurality of channels successively increase from a central region of the assembly to an outer region of the housing.

16. The assembly recited in claim 10 wherein the horizontally extending channels are perpendicular to the vertically extending channels.

17. An air filter assembly for removing dust in air entering the filter with an internal combustion engine fuel system, comprising:

a housing having: an air inlet formed in an upper portion of the housing; and an air outlet;

a plurality of vertically extending baffles disposed within the housing between the upper portion of the housing and a bottom portion of the housing, such baffles forming a plurality of vertically extending channels interconnected horizontally through horizontally interconnecting channels disposed adjacent the upper portion of the housing and an opposing bottom portion of the housing, a first one of the vertically extending channels receiving the air entering the housing from the air inlet, such air then passing laterally outwards in the housing from the first one of the vertically extending channels successively to other ones of the vertically extending channels in a serpentine flow successively upwards and downwardly and through the horizontally interconnecting channels and then finally exiting the housing through the air outlet;

wherein different one of the channels have different cross-sectional areas; and a filter disposed in one of the plurality of vertically extending channels in a path of the serpentine flow of the air passing through such one of the vertically extending channels.

18. The air filter assembly recited in claim 17 wherein cross sectional areas of the plurality of channels successively increase from a central region of the assembly to an outer region of the assembly.

19. The assembly recited in claim 17 wherein the horizontally extending channels are perpendicular to the vertically extending channels.

20. An air filter assembly, comprising:

a housing;

a plurality of vertically extending baffles disposed within the housing between an upper portion of the housing and a bottom portion of the housing, such baffles forming a plurality of vertically extending channels interconnected horizontally through horizontally interconnecting channels, a first one of the vertically extending channels receiving air entering the housing from an air inlet, such air then passing laterally outwards in the housing from the first one of the vertically extending channels successively to other ones of the vertically extending channels in a serpentine flow successively upwards and downwardly and through the horizontally interconnecting channels and then finally exiting the housing through the air outlet;

wherein different one of the channels have different cross-sectional areas; and a filter disposed in one of the plurality of vertically extending channels in a path of the serpentine flow of the air passing through such one of the vertically extending channels.

21. The air filter recited in claim 20 wherein cross sectional areas of the plurality of channels successively increase from a central region of the assembly to an outer region of the assembly.

22. The assembly recited in claim 20 wherein the horizontally extending channels are perpendicular to the vertically extending channels.

* * * * *